310-800
SR
8/4/81 XR 4,282,532

United States Patent [19] [11] 4,282,532
Markham [45] Aug. 4, 1981

[54] INK JET METHOD AND APPARATUS USING A THIN FILM PIEZOELECTRIC EXCITOR FOR DROP GENERATION

[75] Inventor: Roger G. Markham, Webster, N.Y.

[73] Assignee: Xerox Corporation, Stamford, Conn.

[21] Appl. No.: 45,045

[22] Filed: Jun. 4, 1979

[51] Int. Cl.[3] .......... G01D 15/18

[52] U.S. Cl. .......... 346/75; 310/800; 346/140 R; 417/322

[58] Field of Search .......... 310/800; 417/322; 346/140 R, 75; 400/126

[56] References Cited

U.S. PATENT DOCUMENTS

| | | | |
|---|---|---|---|
| 2,512,743 | 6/1950 | Hansell | 346/75 X |
| 3,596,275 | 7/1971 | Sweet | 346/75 X |
| 3,832,580 | 8/1974 | Yamamuro | 310/800 X |
| 3,900,162 | 8/1975 | Titus | 346/75 X |
| 3,958,255 | 5/1976 | Chiou | 346/75 X |
| 4,088,915 | 5/1978 | Kodama | 310/800 X |
| 4,115,789 | 9/1978 | Fischbeck | 346/140 R |
| 4,131,899 | 12/1978 | Christou | 346/140 |

*Primary Examiner*—Joseph W. Hartary
*Attorney, Agent, or Firm*—Michael H. Shanahan

[57] ABSTRACT

A thin film of polyvinylidene fluoride is operated in the piezoelectric thickness mode to stimulate fluid drop formation for ink jet printing systems. The film is placed against a rigid wall of either rectangular, cylindrical or spherical chambers having at least one nozzle for emitting a continuous stream of fluid from which the drops are formed. The frequency of the drop generation is related to the frequency of an AC voltage applied across the piezoelectric film.

39 Claims, 8 Drawing Figures

INK JET METHOD AND APPARATUS USING A THIN FILM PIEZOELECTRIC EXCITOR FOR DROP GENERATION

BACKGROUND

This invention relates to ink jet printing method and apparatus. More specifically, the invention relates to a fluid drop generation method and apparatus of the type wherein drops are generated from a continuous stream of liquid emitted under pressure through a nozzle.

The present type of continuous drop ink jet system is described in U.S. Pat. No. 3,596,275 issued on July 27, 1971 to Richard G. Sweet. The Sweet patent describes three techniques for stimulating or exciting the fluid to obtain a substantially fixed generation rate of drops of equal size and spacing at a stable distance from the nozzle. Among them is a movable member or diaphragm driven by a magnetostrictive or piezoelectric driver located outside the cavity containing the ink. A vibrating nozzle and electrohydrodynamic excitor are the other two types of excitors disclosed by Sweet.

Another piezoelectric device is disclosed in U.S. Pat. No. 3,900,162 to Titus and Tsao wherein a piezoelectric strip bonded to a stainless steel sheet divides a diamond shaped ink cavity into two compartments. The stainless steel sheet is substituted for the diaphragm in Sweet. Another bending diaphragm is disclosed by Denny, Loeffler and West in the August, 1973 issue of the IBM Technical Disclosure Bulletin at pages 789-91, Vol. 16, No. 3. There the bending device is referred to as a bimorphic-piezoelectric ceramic crystal.

U.S. Pat. No. 4,138,687 to Cha and Hou, employs another variation of the movable diaphragm. This patent discloses a pair of piezoelectric ceramic devices sandwiched between two rigid blocks, one called a backing plate and the other a piston. The piston extends into the fluid reservoir and as it is forced up and down by the ceramic transducers it acts upon the printing liquid to form plane waves that propogate through the liquid toward orifices opposite the piston. The entire transducer is coupled to the reservoir block by a holder that isolates the vibration of the transducer from the reservoir block. See also disclosure number 18010 at page 140 of the April 1979 edition of *Research Disclosure* wherein the piston is mercury.

The above and like transducers share a common trait in that each uses a vibrating diaphragm as one wall of the fluid reservoir. The piezoelectric transducer is designed to have an acoustic resonant frequency matched to a desired drop generation frequency. Design problems are especially troublesome in generators that create multiple parallel streams of fluid drops. Prior piezoelectrics transducers used in ink jet application are limited in acoustic bandwidth thereby necessitating that the geometry of the reservoir be tailored to a resonant frequency compatible with the transducer. This need to match to the driver resonance to a desired drop generation frequency inhibits design freedom for various ink jet applications.

SUMMARY

Accordingly, it is an object of the present invention to overcome the limitations and disadvantages of piezoelectric transducers of the foregoing types employed in ink jet applications.

Another basic object of this invention is to devise an improved piezoelectric excitor for fluid drop generating method and apparatus.

Yet another object is to confine the acoustic stimulation of a piezoelectric excitor to the fluid cavity or chamber in a fluid drop generator.

It is an object of this invention to identify a piezoelectric excitor that has a low acoustic impedance for fluid drop generating method and apparatus.

Also, it is an object here to adapt a piezoelectric excitor having an acoustic impedance close to that of water based fluids to fluid drop generating methods and apparatus.

It is also an object of the invention to employ flexible film piezoelectric materials for the first time in fluid drop generation.

The foregoing and other objects and features of the invention are achieved by means and steps including positioning a thin, polymeric piezoelectric film against the interior face of a rigid wall of an ink jet fluid chamber. An exemplary polymer is polyvinylidene fluoride having the chemical formula $$—(CH_2—CF_2)_n—.$$

DISCLOSURE

The Cha et al U.S. Pat. No. 4,138,687 at Column 5, lines 65 to the end of the column, states that the piston member 12 extending into the ink cavity "is preferably made of relatively low acoustic impedance material relatively close to the fluid impedance so that minimum reflection is encountered at the interface therebetween". The patent doesn't identify the material for piston 12. However, it "is intended to act substantially as a rigid body." (See Column 7, lines 1-4). The piston has a plurality of transverse slits cut into it. It is a truncated pyramid that extends into the cavity forming the rear wall. The piston and a backing plate are bolted together with the ceramic piezoelectric device sandwiched between them. Fairly read, the patent indicates the piston and backing plates are metal. Metal does not have an acoustic impedance close to that of a liquid, e.g. water, but its acoustic impedance is reasonably close to that of ceramic piezoelectric devices. An aluminum piston bolted to a stainless steel backing plate meets the design criteria of this patent because the acoustic impedance of aluminum is less than that of stainless steel.

The Titus and Tsao U.S. Pat. No. 3,900,162 states in Column 3 at lines 20-21 that the halves of the diamond shape ink chamber have depths that are preferably one quarter wave length of the wavelength of the operating frequency of the bending transducer. The depth is said to produce a standing wave at each end of the cavity. The transducer is made with barium titanate strips having a thickness of about 10 mils (254 microns). The barium titanate strips are secured to the flexible steel sheet by an adhesive such as a bonding epoxy.

The IBM Technical Disclosure Bulletin by Denny et al describes a single nozzle ink drop generator employing an ink cavity referred to as a liquid horn. At page 791, the article says:

"The shape of the horn cavity is such that pressure fluctuations, induced by the motion of diaphragm 16 into the ink in the cavity, are amplified at the orifice from whence squirts the ink stream. This produces higher pressure amplitudes at the orifice and larger velocity modulations of the jet than are possible with a plainpipe cavity, when driven by the same input electrical power.

The dimensions of the liquid-horn concentrator are chosen preferably to make the resonance frequency of the horn about equal to the operating frequency of the drop generator. These dimensions are determined experimentally, since no comprehensive theory of a liquid-horn structure appears to exist. Estimates indicate that the axial length of a liquid horn at resonance may be from one-quarter to one-half the wavelength of sound in ink at the operating frequency. The bending motion of the diaphragm 16 for a given applied voltage is significantly larger than the motion of a sandwich-type transducer operated at the same driving voltage, thus increasing the efficiency of the head."

An IBM West German Patent Application No. P28 12 372.0 discloses a piezoelectric crystal that is a partial cylinder.

An article "Flexible $PVF_2$ Film: An Exceptional Polymer for Transducers" in the June 1978 edition of *Science,* Vol. 200 at pages 1371–1374 discusses several applications for polyvinylidene fluoride films. In the middle column on pages 1372, polyvinylidene fluoride is noted as having an acoustic impedance quite close to that of water. It goes on to explain that the low impedance is one reason a hydrophone application works so well. However, the hydrophone applications are as sensors to detect acoustic waves in water and not to put acoustic energy into water.

An audio speaker using polyvinylidene fluoride film is described in a paper titled "Electroacoustic Transducers with Piezoelectric High Polymer Films" by M. Tamura, T. Yamagucha, T. Oyaba and T. Yoshimi of the Pioneer Electronic Corporation of Japan. The paper was presented Sept. 10, 1974 at the 49th Convention of the Audio Engineering Society, New York and is printed in the January/February 1975 *Society Proceedings,* Volume 23, Number 1.

THE DRAWINGS

Other features and objects of the invention are apparent from the specification and drawings alone and in conjunction with each other. The drawings are:

DETAILED DESCRIPTION

Figure 1:
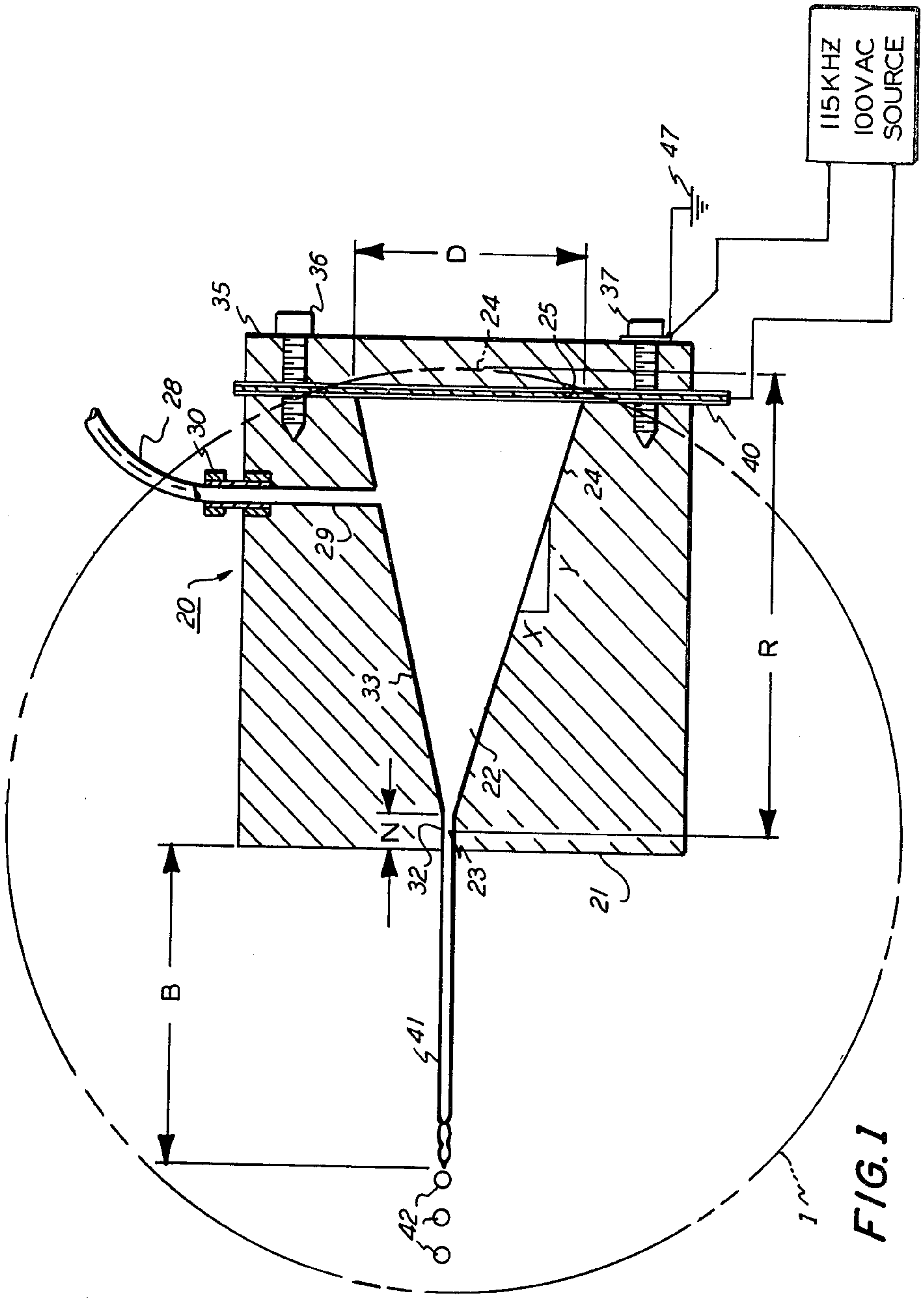
FIG. 1 is a side, cross-sectional view of a fluid drop generator of the present invention for the case of both a spherical and cylindrical fluid resonant cavity.

Heiji Kawai of the Koboyashi Institute of Physical Research, Tokyo, Japan reported the piezoelectric properties of polyvinylidene fluoride ($PVF_2$) in a 1969 article in the *Japanese Journal of Applied Physics,* Volume 8, at page 975. $PVF_2$ has at least alpha, beta and gamma forms. The beta $PVF_2$ is one form that exhibits an extraordinary piezoelectric (as well as pyroelectric) activity. The other forms of the film also exhibit the piezoelectric activity both before and after "poling". "Poling" is discussed below. For a discussion on the above three forms of $PVF_2$ the reader is referred to a 1975 article by Pfister, Prest and Abkowitz in *Applied Physics Letters,* Volume 27, at page 486. $PVF_2$, when fabricated as a thin film, resembles present day home, transparent wrapping products for storing left-over food in a refrigerator.

"Poling" of $PVF_2$ is reported by Kawai in his above cited article and that paper is expressly incorporated by reference into this application. Briefly, a sheet of alpha $PVF_2$ film having evaporated electrodes on both sides is stretched and heated to about 100° C. A DC voltage is applied between the electrodes to establish an electric field of about 500 volts per centimeter (CM) (higher fields are now preferred) in the $PVF_2$. The field and temperature are maintained from several minutes to several hours. Thereafter, the $PVF_2$ is allowed to cool to room temperature in the presence of the electric field. The DC field is removed and the electrodes shorted to relax weakly bound injected charges. The poling process yields a $PVF_2$ that exhibits an excellent piezoelectric activity.

Another poling technique is reported by D K. Das-Gupta and K. Doughty in an 1978 article in the *Journal of Applied Physics,* Volume 49, at page 4601 and by a 1976 article by G. W. Day et al in *Ferroelectrics,* Volume 10, at page 99. The disclosures of these articles are also expressly incorporated into this application. The second technique is to electrostatically charge alpha $PVF_2$, while extended or stretched, with an electrostatic corona generating device. The field established by the ions deposited on the film surface by a corotron is in excess of 1,000,000 volts per cm. The process is carried out at room temperature and the charge is held on the film for several seconds to several minutes. Clearly, the charged surface need not be electroded or metalized prior to the poling process. Once again, the process yields a $PVF_2$ that exhibits excellent piezoelectric activity. The treated $PVF_2$ reportedly has substantially the same properties as obtained by the first technique.

For more information on polyvinylidene fluoride, consult the reprints of papers on the subject presented at the 175th Meeting of the American Chemical Society of Mar. 12–17, 1978 reported in Volume 38 of *Organic Coatings and Plastics Chemistry* published by the American Chemical Society. In particular see the papers beginning at pages 266 and 271.

The various forms of $PVF_2$ are a subject of continuing study and no theory of operation or absolute understanding of the material is universally agreed to by researchers. In fact, $PVF_2$ exhibits an electrostrictive action as well as the piezoelectric action associated with internal electrical polarization. The term piezoelectric film is therefore intended to include materials that experience an external dimensional change in response to an applied electrical field regardless of the mechanism that causes that change.

$PVF_2$ film in thicknesses from about 3 to 500 microns (μm) are commercially available from the Pennwalt Corporation, Westlakes Plastics, Philadelphia, Pa. and Kureha Chemical Industries Co., Ltd, of Japan. The material is available as a powder as well as a film. The fabrication process for the film from the powder is understood to influence the piezoelectric properties of the film. Kureha is known to have produced films that have aluminum electrodes on both sides of a beta $PVF_2$ film.

Other flexible, thin film polymerics known to exhibit piezoelectric properties akin to that of $PVF_2$ include copolymers of $PVF_2$. Specifically, Mortimer Labes, Robert Solomon and their collegues at Temple University, Philadelphia, Pa. are reported as having studied a copolymer of $PVF_2$ and Teflon, a trademark of the E. I. DuPont Corporation of Wilmington Del., for polytetrafluoroethylene. Other copolymers are $PVF_2$ with: chlorotrifluoroethylene; with hexafluoropropene; and with pentafluoropropene.

Another piezoelectric polymer is polyacrylonitrile. Also, nylons with odd numbers of carbon atoms between connecting groups of the polymer are understood to be piezoelectrically active. The Teflon copolymer and the other polymers are mentioned in the article by Arthur L. Robinson in *Science* cited above. The disclosure of that article as well as the cited article by the employees of the Pioneer Electronics Corporation are expressly incorporated by reference into this application.

This invention deals with the inclusion of a polymeric, piezoelectric film in the ink cavity of a fluid drop generator. The preferred polymer is the herein identified $PVF_2$. $PVF_2$ not only has good piezoelectric properties and dielectric constant but is stable over the temperature ranges suited for ink jet printing systems and shows good chemical resistance to the water based inks used in ink jet systems. Also, the acoustic impedance of $PVF_2$ is close to that of the water based inks employed in ink jet systems.

The matching of the excitor's acoustic impedance to that of water is significant because the water based ink and polymer form a composite resonant system within the volume of the liquid cavity or chamber. The chamber walls are selected to have a high acoustic impedance so that the resonant behavior of the system is determined by the fluid and the geometry of the fluid chamber. In contrast, the piezoelectric transducers previously reported represent separate resonant systems. The separateness requires—for good design—that the resonant frequencies of the exciter and the fluid cavity be matched. In multiple nozzle generators, a mismatch would result in exciting undesirable modes in either the excitor, the fluid cavity or both. The consequence is that matched streams of drops are very difficult if not impossible to achieve.

The liquid chamber of the present invention is designed to impart an acoustic resonant frequency near that of the desired drop generation frequency or rate to a liquid in the chamber. The acoustic resonant frequency of the exciter means, however—unlike the prior art—is not matched to the desired drop generation frequency. Rather the acoustic resonant frequency of the exciter means is substantially higher than that of the drop generation frequency. Consequently, the exciter of the present invention is operated at a non-resonant frequency when energized at the drop generation frequency yet it is able to stimulate the liquid in the chamber adequately to promote drop formation at the desired rate. This is possible in large part because the liquid chamber is acoustically resonant at the desired drop generation frequency.

Thin piezoelectric exciters have acoustic resonant frequencies substantially higher than the presently preferred drop generation rates of from about 30 to over 200 kilohertz. For example, the 3 to 500 micron thick films with their associated electrodes and insulators disclosed herein have acoustic resonant frequencies in the megahertz range which is well above the foregoing drop generation frequencies. Thin in this context means that the thickness of the exciter means is much less than one-half the wavelength of the speed of sound in the exciter material when the exciter is energized at the drop generation frequency. That is, the thickness is less than that required to set the resonant frequency of the exciter means to the desired drop generation frequency.

The 3 to 500 micron thick $PVF_2$ films with their associated electrodes and insulation disclosed herein fit inside the liquid chamber and cause the chamber length to the reduced by the amount of their thickness. A rectangular cross-section chamber containing a water based liquid has a resonant frequency of about 115 kilohertz when it has a length of about 0.652 centimeters. The speed of sound in water is about 1500 meters per second. In this case, the chamber is one-half wavelength long. Therefore the 3 to 500 (plus 100 microns for electrodes and insulators) micron dimension changes to the chamber created by the presence of an exciter in the chamber do not significantly or meaningfully shift the resonant frequency of the chamber.

The speed of sound in $PVF_2$ is about 2200 meters per second. Therefore, the resonant frequencies of 3 and 500 micron thick $PVF_2$ films are, respectively, about 367 and 2.2 megahertz. For a $PVF_2$ film to be resonant at 110 kilohertz it must have a thickness of about one centimeter.

The piezoelectric excitor of this invention is located at a position of maximum acoustic stress and strain, that is at points where pressure maxima occur. This location is important because the driving force is derived from dimensional changes in $PVF_2$ related to the $d_{33}$ piezoelectric constant. If the film excitor is located at points of minimal stress and strain, i.e. pressure nodes, only translational motion will stimulate a pressure change in the chamber. A polymeric, thin film excitor can be located at points between pressure maxima and nodes but the excitation efficiency is less.

The $d_{33}$ constant refers to a three dimensional orthogonal axis. The subscript 33 associates the constants with dimensional changes in the material in the axis of the applied electric field, e.g. the z axis. A $d_{31}$ piezoelectric constant is associated with dimensional changes in the x axis, for example, due to a field applied in the z axis. The $d_{32}$ constant relates to the y axis.

To repeat, there are three important consideration to the present excitors. The first (1) is the matching of the acoustic impedance of the excitor to that of the fluid. The second (2) is the high acoustic impedance of the fluid cavity walls to produce a fluid chamber with well defined resonances, at least one of which is the desired mode. A metal wall of moderate thickness to resist bending or vibration is an example of a wall with a high acoustic impedance certainly as compared to that of water and $PVF_2$. The third consideration (3) is the location of the excitor at a resonant pressure maximum in the fluid cavity.

Figure 5:
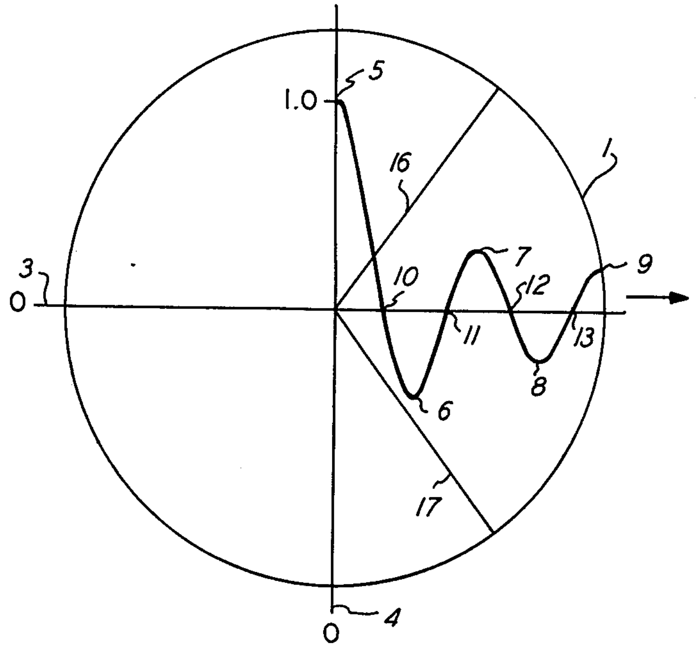
FIG. 5 is a diagram of both a spherical and cylindrical fluid chamber with a Fourier-Bessel function curve representative of the changes in pressure from the center to the wall of a sphere or cylinder.
Figure 6:
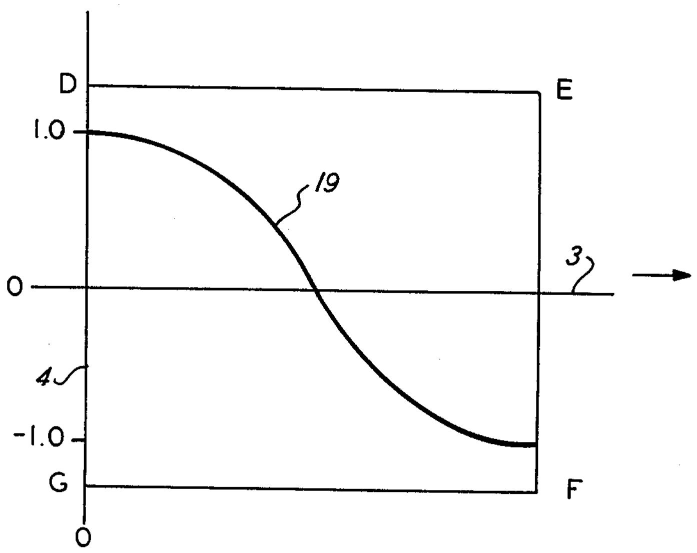
FIG. 6 is a diagram of a rectangular fluid chamber with a sinusoidal curve representing the changes in pressure between opposite walls of the chamber.

FIGS. 5 and 6 are helpful to understanding the location of the present excitor within a resonant fluid cavity. FIG. 5 is the general case for either a spherical or cylindrical cavity. FIG. 5 is a simplified schematic of the ink jet apparatus of FIG. 1 which also represents both the spherical and cylindrical cavity apparatus. The circle 1 (seen in both FIGS. 1 and 5) represents the cross-sectional outline of either a spherical or cylindrical chamber. Curve 2 of FIG. 5 is a spherical or regular Bessel function that is representative of the pressure maxima and nodes within a sphere or cylinder filled with a fluid. The fluid is under a static pressure of from about 138 to 690 kilo Pascals (kPa). The x-axis 3 represents the radial distance and is marked zero but should be understood to represent the static pressure in the fluid chamber. Likewise, the zero reference at the x-axis in FIG. 6 also represents the static pressure in a rectangular fluid cavity.

The y-axis 4 in FIGS. 5 and 6 represent the change in pressure above or below the static pressure in the fluid chambers. Curve 2 is normalized.

The peaks 5, 6, 7, 8 and 9 of curve 2 are the points of pressure maxima within a spherical or cylindrical fluid cavity. They are plotted as a function of distance, r (radius) from the center of the sphere or cylinder and can be calculated for a given fluid in a spherical or cylindrical cavity as is well understood in acoustic and fluid mechanics. These maxima are the points at which an excitor of the instant case is best located. The nodes 10, 11, 12, and 13 or zero crossings are the points of minimum stress and strain and are the least efficient for location of an excitor.

Curve 2 may be explained as follows. If a source of waves located at the center of a spherical or cylindrical cavity emits continuously, the emitted waves propagate radially outward and are reflected in place back toward the center. If the source is emitting at the resonant frequency of the cavity the reflected waves will add constructively with the emitted waves even after many reflections. The resulting pressure amplitude profile is illustrated by curve 2. Curve 2 is qualitatively similar but quantitatively different for the spherical and cylindrical cavities. In the real world it is difficult to introduce a pressure variation at the center but, due to the present invention, is achievable at the wall represented by circle 1.

The present invention proposes that the chamber be lined with a thin polymeric film. The piezoelectric film is excited and creates a pressure disturbance at the wall, i.e. circle 1. Since the resonant standing wave is built up of many reflected waves, it does not matter that the disturbance is created at the wall rather than the center. In the sphere, the pressure at the center is 4.5 times the pressure at the next maximum and for the cylinder the central pressure is 2.5 times the pressure at the next maximum.

In practice, the spherical or cylindrical chamber is reduced to a pie-shaped cross-section as indicated by the lines 16 and 17 with a nozzle for emitting the fluid located at the center. (See FIG. 1) It is desirable to operate the fluid cavity in its lowest radial mode to be as free as possible of other resonances. This condition corresponds to placing the wall at the first maximum away from the center. Thus, the relationship between the chamber radius "R" and the wave length "L" of sound in the fluid is $$R=0.715L$$

for the spherical chamber and $$R=0.610L$$

for the cylindrical chamber. Notice that the distance between pressure maxima is not one half wave length in these geometries.

FIG. 6 is the case for a rectangular fluid cavity. The rectangle DEFG represents the cross-section of a rectangular fluid chamber of length measured along the x-axis 3. A unit pressure above static pressure is introduced at the wall DG and propagates through the cavity sinusoidally to the wall EF. The length (distance DE or FG) is selected to be one-half the wavelength of the speed of sound in the particular fluid in the cavity. The curve 19 represents the pressure maxima and node within the chamber DEFG. According to the instant invention, wall DG has a film excitor positioned against it and a nozzle is located at the bisector of wall EF. The unit pressure change introduced at wall DG by the excitor yields a unit pressure change (relative to the static pressure) at the nozzle in wall EF.

The performance of the rectangular chamber is characterized by the following model which assumes the speed of sound is the same in $PVF_2$ as in the fluid. Also, the affect of an input feed tube to the chamber is ignored. Using the coordinate system of FIG. 6, and the designations in FIGS. 6 and 7, the following expressions apply:

$$N_x=N_o \sin (k\,x) \sin (wt) \quad \text{Equation (1)}$$

$$P=P_o \cos (k\,x) \sin wt \quad \text{Equation (2)}$$

$$P_o=wqcN_o \quad \text{Equation (2a)}$$

Equation (1) is the expression for the variations of acoustic displacement, $N_x$, of the molecules in the fluid and $PVF_2$ as a function of distance x along the direction of propagation of the acoustic wave. $N_o$ is the displacement amplitude of the acoustic wave. (A standing acoustic wave condition in a half-wave length long acoustic rectangular chamber is assumed.) The sin (wt) term is the variation of the molecular or acoustic displacement with time t, at a radial frequency, w. The sin (k x) term is the variation of acoustic displacement within the chamber as a function of distance x. k is the wave number which is $2\pi$ divided by the wavelength, 1, of the acoustic wave.

Equation (2) is the expression for the pressure variations on the molecules in the fluid. The cos (k x) term is the pressure variation as a function of position along the x-axis and k is once again $2\pi/1$. $P_o$ is the pressure amplitude of the acoustic wave which is related to $N_o$ by Equation (2a). The term q is the density of the fluid (and $PVF_2$) and c is the speed of sound in the fluid and $PVF_2$.

The change of thickness $\Delta d$ (See FIG. 7) of the $PVF_2$, which is of the thickness d, is expressed in terms of equation (1) as $$\Delta d=N_x(x=d)=N_o \sin (kd) \sin (wt)$$

A time t is selected at which sin (wt)=1. Since d is from about 3 to 500 microns, (the $PVF_2$ film thickness disclosed herein), the angle kd is small and sin (kd) is approximately equal to kd. Therefore $$\Delta d = N_o \, dk$$

or $$N_o = \Delta d/d \cdot l/k \qquad \text{Equation (3)}$$

Once again, time t is selected for the case where sin (wt)=1 and cos (kd) is approximately 1 for small angles. Therefore the pressure at the wall and in the film is $$P_o = wqcN_o.$$

From equation (3), $$N_o = \Delta d/d \cdot l/k$$

and therefore, $$P_o = wqc/k \cdot \Delta d/d.$$

The pressure or acoustic displacement introduced at the wall DG (FIG. 6) of a rectangular chamber is therefore a function of the ratio of the change in the film's thickness relative to its total thickness. Since the film is very thin, the ratio is significantly large.

The relevant piezoelectric parameter for thickness changes is the constant $d_{33}$. For a 9 micron thick $PVF_2$ film, aluminized on both sides, purchased from Kureha Chemical Industries Co., Ltd, $d_{33}$ is about $20\times10^{-6}$ microns per volt where the voltage is that coupled across the aluminum electrodes. By way of example, 10 volts applied across a $PVF_2$ exciter at wall DG of a rectangular cavity yielded a pressure increase above static pressure of about 50 kPa at a nozzle located at wall EF. However, this value of 50 kPa is potentially overstated by as much as a factor of 5 due to an assumption made to permit the application of the preceeding mathmatical analysis. The assumption is that the thickness of the $PVF_2$ film is able to change the full Δd value while submersed in a cavity containing a liquid ink. Because the liquid responds dynamically, the assumption can lead to errors in the calculation. The calculations for a model taking into consideration the dynamic action of the fluid are complex and as such are not reported here. Those calculations are left to the reader needing a more precise analysis of the results described herein.

Turning to FIG. 1, the fluid drop generator 20 includes the block or body 21 containing the resonant fluid cavity 22. Cavity 22 is a conic section of a sphere or it is a triangular section of a cylinder. In the spherical case, a single nozzle is located at the center 23 of the spherical surface formed in the wall of the cavity. For ease of construction, the spherical surface 24 opposite the nozzle is approximated by a plane surface 25. The approximation is acceptable for small conic section angles.

In the cylindrical case, either a single or multiple nozzle (see FIG. 4) are located at the center 23. The center 23 represents the axis of a cylinder rather than the center of a sphere in this case. Similarly, the dashed line 24 represents the surface of a cylinder opposite the nozzle rather than of a sphere. The plane surface 25 is also a valid approximation for the cylindrical surface for small triangular sections of a cylinder. Hereafter, only the cylindrical case is discussed to avoid redundency. The changes to the disclosure for the spherical case are apparent in view of the description for the cylindrical case.

A fluid is fed under a static pressure into the cavity or chamber 22 by the tube 28. The tube is coupled to an inlet conduit 29 by a suitable fluid connector 30. The inlet is a hole drilled through the generator block 21 into the cavity. The location of the inlet 29 within the cavity is selected to minimize its affect on the resonant design of the cavity. A preferred location is at a radius from the center 23 that corresponds to one of the pressure nodes 10–13 in FIG. 5.

The nozzle 32 is an orifice formed in the generator block at the center 23. It has a length N which is the thickness of the block in the region of the nozzle. Ideally, N is zero but it has some finite length to enable the chamber 22 to be formed with walls that are rigid in the vicinity of the nozzle. That is, the acoustic impedance of the walls of the chamber 22 must be great compared to that of the fluid.

The slope or angle of the chamber x/y (see in FIG. 1) can vary widely. To provide as much drive surface as possible, the angle should be large. If the back wall of the cavity is flat, (as in FIG. 1) the angle should be small to keep the deviations of the flat wall from the optimum cylindrical wall to a minimum. Additionally it is desirable to have the frequency of the lowest angular resonant mode be higher than the desired operating frequency. This requires that x/y be less than about 0.58 which is a cavity angle of 60° (the angle between the walls 33 and 34 in FIG. 1. A conservative selection for the angle between lines 33 and 34 is 40°. The length R of the cavity 22 is 0.80 cm for an operating frequency of 115 kilocycles per second (hereafter kHz meaning kilohertz) with a water based ink. The width of the cavity is determined by the slope x/y and length R.

The plane surface 25 is the rear wall of the cavity and is part of the rigid body cap 35 that is anchored to the body 21 by at least two threaded screws 36 and 37. The flexible film excitor 40 is positioned between the cap 35 and the body 21. The excitor 40 has cut-outs (not shown) adjacent the screws 36 and 37 to permit the screws to mate with threads tapped in the generator body 21. A reference to the generator body is meant to refer to both the body and the cap unless otherwise specified.

The fluid static pressure is from about 20 to 100 psi as developed by a pump (not shown in FIG. 1) coupled to the tube 28. The static pressure causes fluid to be emitted through the nozzle 32 in a continuous stream 41. For a given pressure, nozzle diameter, and other parameters, drops 42 form from the continuous stream at break-off distance B. The break-off distance is determinable according to the models developed by Lord Rayleigh. The break-off distance B, the size of the drops and their spacing (drop wavelength) are controllable by stimulating or exciting the fluid at a predetermined frequency. For high quality image formation in printing systems, the excitation rate is generally from about 35 to over 200 kHz. Presently, a commonly used range is from about 100 to about 130 kHz.

The excitor 40 is designed to introduce pressure variations in the static pressure at the nozzle 32 in the order of about 5–15 psi at a rate of about 115 kHz. The excitor 40 is seen enlarged in FIG. 2. The static fluid pressure forces the flexible excitor against the plane surface 25 of cap 35. There is no need to attach the excitor to the cap by an adhesive unless it is desirable to do so for ease of handling and assembly of the generator. The excitor is shown separating the body 21 and the cap 35 and as such serves as a gasket to prevent fluid from escaping. Alternately, o-ring gaskets are located in the body 21 to seal the unit.

Figure 2:
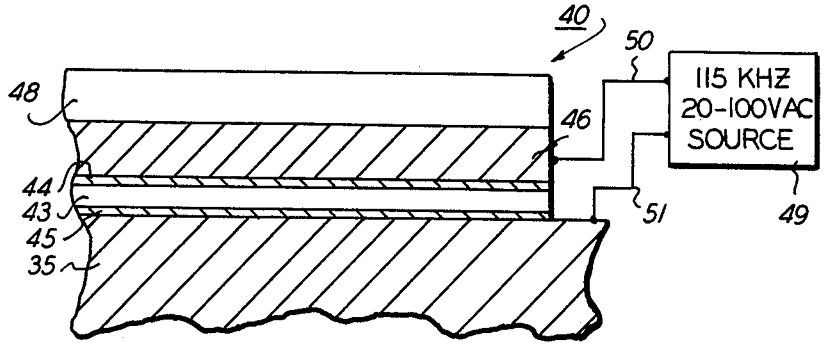
FIG. 2 is an enlarged, sectional view of the polymeric piezoelectric excitor of this invention shown in FIG. 1.

The excitor is the $PVF_2$ layer 43 about 9 microns thick (FIG. 2). The layers 44 and 45 are metal (e.g. aluminum) conductive layers less than a micron thick vacuum evaporated onto the film 43. The electrode 44 is in electrical contact with the 25 micron thick brass foil layer 46 while the electrode 45 is in electrical contact with the metal cap 35. The brass foil layer is optional serving to provide a more robust electrode at some loss of acoustic excitation.

As explained earlier, the increased thickness to the exciter caused by the presence of brass foil electrode 46 (and insulator 48) still keeps the total thickness of exciter 40 much less than one-half the wavelength of the speed of sound in the exciter at the 115 kilohertz exciting voltage. That is, the exciter is still thin. The thicker exciter is still operated at a non-resonant frequency when supplied with the 115 kilohertz voltage. Also, the variation in the length of a liquid chamber by the total thickness of the exciter 40, about 61 microns, does not meaningfully change the resonant frequency of a liquid in the chamber. The fluid is conductive for electrostatic ink jet systems and is normally coupled to electrical ground. That convention is used here as represented by the electrical ground symbol 47 coupled to screw 37 (FIG. 1). The screw electrically grounds the cap 35 and body 21 which in turn ground the fluid in the cavity 22.

The fluid can serve as one electrode for the piezoelectric layer and the body can serve as the other electrode if the film is properly applied. In other words, the conductive layers may be replaced. However, it is presently preferred to use the piezoelectric with conductors deposited on each side. For one, currents in the ink may cause undesirable electro-chemical problems.

The electrical insulating layer 48 is adjacent the brass layer 46 to electrically isolate the voltage on the brass foil from the fluid. A 115 kHz, 100 volt AC source 49, for example, is coupled across the $PVF_2$ layer 43 by the leads 50 and 51. The insulator layer 48 is made from a 25.4 micron layer of Mylar, a tradename of E. I. DuPont for a polyester. $PVF_2$ itself is a good electrical insulator and has good chemical resistance. As such, $PVF_2$ may serve as the insulating layer 48. If desired, an insulating layer may also be included between the electrode 45 and the cap 35.

Figure 3:
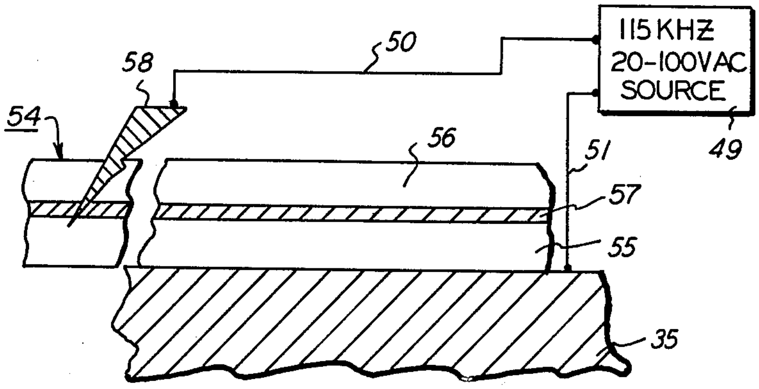
FIG. 3 is an enlarged, sectional view of another embodiment of the polymeric piezoelectric excitor of this invention.

FIG. 3 illustrates an excitor 54 that is the type indicated above. That is, both the excitor layer 55 and the insulator layer 56 are made of $PVF_2$ films, e.g. of about 9 microns thickness. The layer 57 is a conductive layer and the 115 kHz oscillator 49 is coupled by leads 50 and 51 to the layer 57 and the cap 35. To be sure of proper electroding, the metal-$PVF_2$ interface should be intimate like that obtained in high pressure laminating. A metal spear 58 pierces the insulating layer 56 to make contact with the metal layer 57. To avoid electrical shorting, the spear should not be in contact with the conductive fluid in the cavity.

Figure 4:
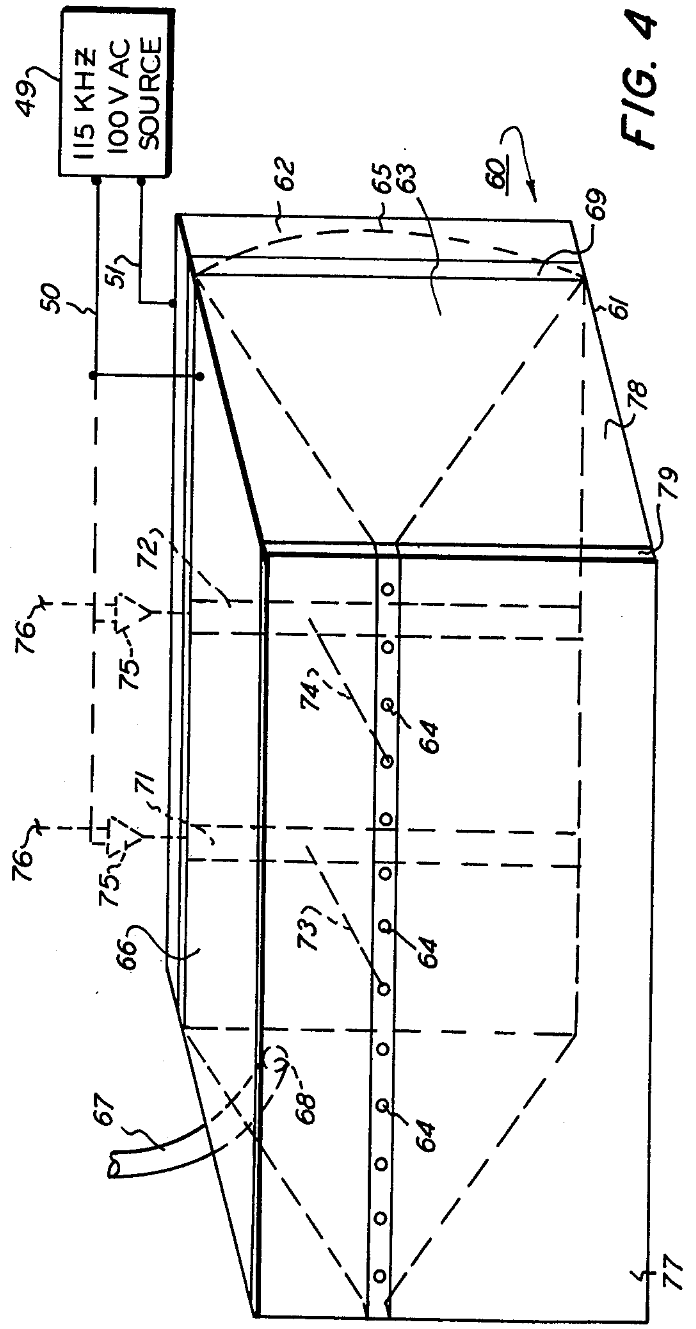
FIG. 4 is an isometric view of a multiple nozzle fluid drop generator having a cylindrical fluid resonant cavity.

The fluid drop generator 60 of FIG. 4 includes the metal body or block 61 and body cap 62. The fasteners for tightly coupling the cap to the body are not shown. The screws 36 and 37 in FIG. 1 would suffice. The fluid chamber 63 is a triangular section of a cylinder with the nozzles 64 located along the axis of the cylinder. The cylindrical wall is shown in dashed lines 65 because the cylindrical surface is approximated by a plane surface 66 on the body cap 62. Fluid is supplied to the cavity under a static pressure via tube 67 which couples to an inlet 68 drilled through the wall of the body into the cavity. The polymer excitor 69 is positioned against the cap 62 over the entire area of the cavity wall 66. By covering the entire area of the walls, the exciter means imparts near zero excitation to the liquid in the chambers along axes orthogonal to the axis of a nozzle 64. The 115 kHz AC source 49 is coupled to the excitor by the leads 50 and 51. The construction of excitor 69 is like that described in connection with FIGS. 2 and 3. The excitor of FIG. 7, of course, could be used as well as other modified excitors.

Figure 7:
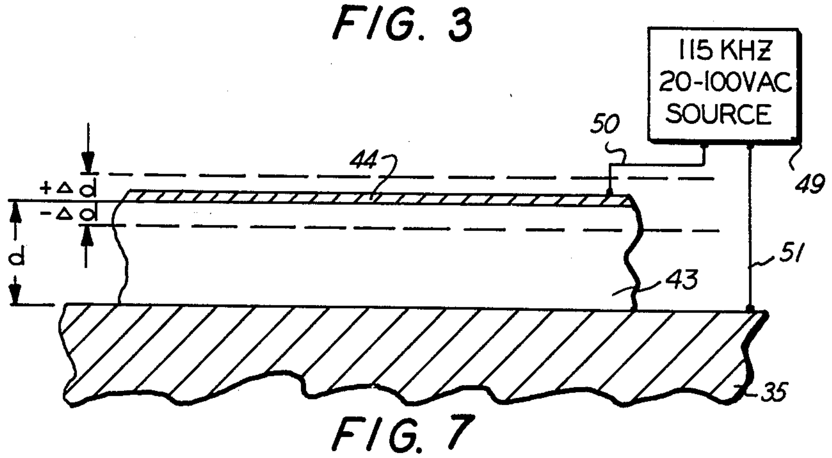
FIG. 7 is an enlarged, sectional view of yet another embodiment of the polymeric piezoelectric excitor of this invention with the dashed lines indicating (by exaggeration of the physical dimensions) the limits of motion of the body of a piezoelectric polymer film.

Another embodiment for a cylindrical fluid drop generator is possible that enables the pressure varicosities along the nozzle array to be varied smoothly. In this case, the electrode on excitor 69 corresponding to electrode 44 in FIGS. 2 and 7 is not continuous but formed as a plurality of conductive strips. The strips 71 and 72 shown in FIG. 4 as dashed lines help explain this embodiment. The strips 71 and 72 are typical of conductive bands aligned opposite the nozzles 64 as indicated by the dashed lines 73 and 74 that are the axii of parallel continuous streams emitted from the nozzles. Also, walls parallel to the axii are added (not shown) to make separate resonant cavities for each nozzle.

In the embodiment represented by the strips 71 and 72, the output at lead 50 from the oscillator 49 is coupled by a parallel arrangement of amplifiers 75 (shown in dashed lines) to each individual strip. The amplifiers include an input 76 capable of varying the amplitude of the 115 kHz voltage applied to the strips (e.g. strips 71 and 72). (The inputs 76 are under the control of a device such as controller 87 discussed in connection with the system of FIG. 8.) The individual regulation of the fluid stimulation for each nozzle is beneficial to compensate for non-uniformity in pressure conditions at the various nozzles due to fabrication and material tolerances. Also, the pressures at the nozzles near the end walls 77 and 78 of the generator are likely to be different from those near the center of the array of nozzles.

Yet another variation to the embodiment of FIG. 4 is to provide several separate conductive strips. For example, it may be desirable to excite the film near the end walls differently than the film in the middle.

The generator 60 differs from that in FIG. 1 in that the nozzles are formed in a face plate 79 coupled to the body 61 by screws or the like. The face plate is used in lieu of machining or casting the nozzle in the body such as indicated in FIG. 1.

Figure 8:
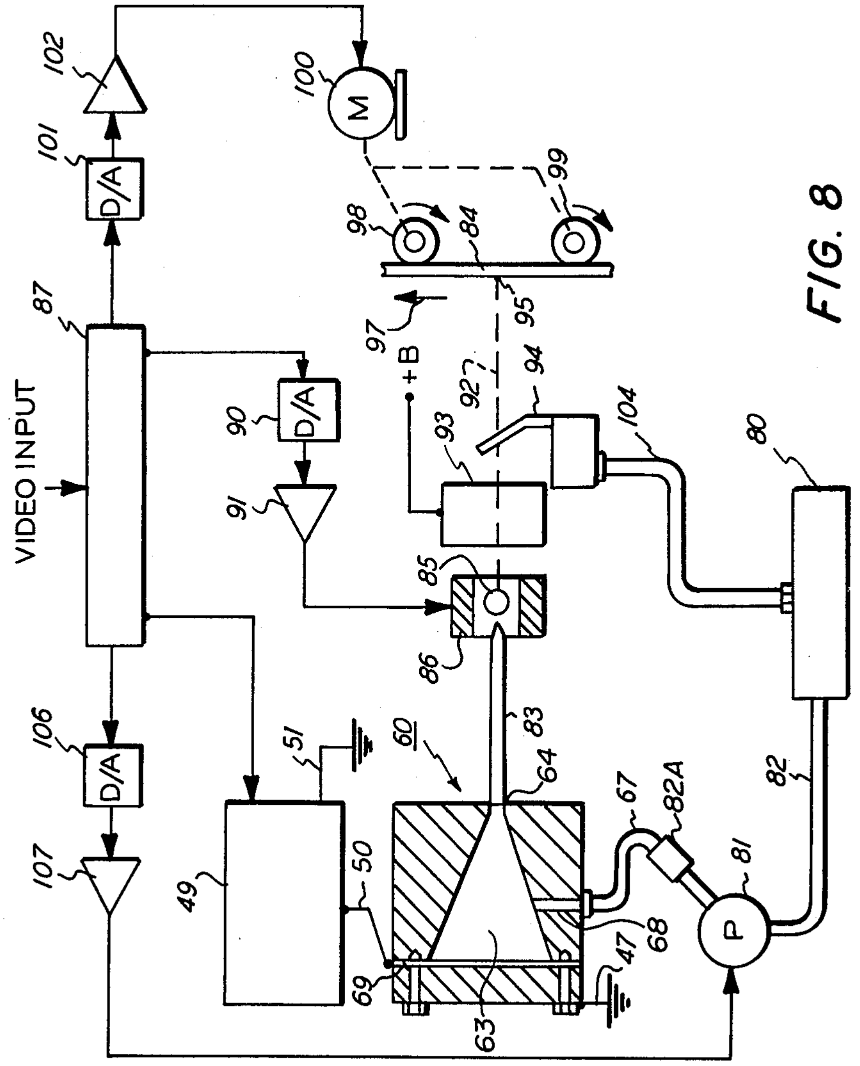
FIG. 8 is a schematic diagram of a fluid drop (ink jet) printing system employing a fluid drop generator of this invention.

The generator 60 (or a modified version using multiple electrodes 71 and 72) is employed in the fluid drop printing system of FIG. 8. The ink or fluid is stored in a reservoir 80. The cavity 63 is in communications with the fluid in the reservoir through inlet 68, tube 67, pump 81 and tube or pipe 82. Device 82A is a filter to remove particles from the fluid that could clog the nozzles. Continuous streams of fluid are emitted from the plurality of nozzles 64 toward a target or printing surface 84. A continuous formation of drops 85 from the streams occurs at charging electrodes 86 associated with each stream. The formation of the drops is promoted by the stimulation of the ink by the excitor 69 in the drop generator. The exciter is driven by the 115 kHz source which in turn is regulated by microprocessor or controller 87.

The video input signals to be printed on the target 84 are fed into the controller. The controller formats the data and orchestrates the various system operations. The controller applies signals to the individual charging electrodes through a digital to analog (D/A) converter 90 and amplifier 91 associated with each charging electrode.

The charge induced in a drop 85 at a charging electrode affects its flight path in the plane 92 normal to the plane of FIG. 8. Charged drops are deflected in plane 92 proportionally to their charge by a pair of deflection plates 93 (only one is shown) positioned in the flight path of each stream of drops. A gutter 94 is provided for each stream of drops to collect drops not intended for marking the target. A steady state electric field established across the flight path of the drops by the deflection plates deflects charged drops. The field is created by a voltage difference between the plates 93 of from about 2000–4000 volts.

The drop generator 60 has an array of nozzles 64 of a width corresponding to the width of a scan line 95 on the target 84. Each nozzle generates drops that are positioned at a plurality of different positions on a segment of the scan line by charging the drops 85 to different levels. For example, each nozzle produces drops that are potentially able to mark twenty-five (25) adjacent pixel or drop positions within a segment of scan line 95. The linear density of the nozzles 64 in the generator, in this example, is therefore one nozzle every 25 pixels positions. Good quality images are obtained using drops of about 50 microns in diameter formed from nozzles 64 that have diameters of about 25 microns. In other words, the drops (while in flight) have diameters roughly twice that of the nozzle diameters from which they were generated. The nozzle density for this example is therefore about one nozzle every 2200 microns.

Returning to FIG. 8, scan line 95 is established across the target 84 by the array of nozzles 64, the charging electrodes 86 and the deflection plates 93. Parallel rows of scan lines 95 are formed by moving the paper or target 84 in the direction of arrow 97. The controller 87 commands the movement of the target. Appropriate drive means such as the feed rollers 98 and 99 are rotated by motor 100 to advance the target in the direction of arrow 97. The motor is operated by the controller via the D/A converter 101 and amplifier 102.

The drops 85 not needed to mark target 84 are collected by gutter 94. The gutter is located within plane 92 addressable by some predetermined charge level. The drops collected by gutter 94 are returned to reservoir 80 via the tube or conduit 104. The pump under the command of the controller via D/A converter 106 and amplifier 107 recirculates the fluid after its return to the reservoir.

Based on the drawings and the foregoing descriptions, various modifications to the invention are apparent. These modifications are intended to be within the scope of the invention. In particular, the invention includes the use of thin film devices, whether monomers or polymers, that have accoustic impedances near that of an ink—for example water or oil based—and which are able to impart pressure variations into the fluid when an electric field is applied across it.

What is claimed is:

1. Apparatus for generating liquid drops at a desired drop generation frequency comprising a body including a liquid chamber defining an acoustic resonant frequency for a liquid in the chamber near the drop generation frequency, inlet means for coupling the chamber to a source of liquid under pressure, at least one nozzle means coupled to the chamber for emitting a continuous stream of liquid due to liquid pressure from which drops are formed and thin, non-bending excitation means coupled to the chamber for stimulating pressure variations in a liquid in the chamber at a frequency near the drop generation frequency but itself having an acoustic resonant frequency substantially higher than the drop generation frequency including a piezoelectric material and electrode means for coupling to the piezoelectric material an AC electrical energy source having a frequency near the drop generation frequency for creating dimensional changes in the excitation means whereby drops are formed from a continuous stream near the desired drop generation frequency.

2. The apparatus of claim 1 wherein the excitation means is located within the chamber at a pressure maximum location determined from the geometry of the chamber.

3. The apparatus of claim 1 wherein the excitation means is located against a rigid wall of the chamber opposite a wall to which the nozzle means is coupled.

4. The apparatus of claim 1 wherein said body includes a chamber having a plurality of nozzle means for emitting a plurality of continuous streams of fluid from which drops are formed.

5. The apparatus of claim 4 wherein the excitation means includes a plurality of separate electrode means on the same side of the excitation means for coupling to an AC electrical energy source for promoting dimensional changes in the excitation means and means for coupling the AC energy to the plurality of electrodes to vary the pressure in the fluid at different nozzle means to compensate for local fluid pressure variations within the chamber.

6. The apparatus of claim 1 wherein said body includes a plurality of chambers each with its own nozzle means and wherein an excitation means is located in each of the chambers.

7. The apparatus of claim 6 wherein the plurality of excitation piezoelectric film means includes a single sheet of film shared by each of the resonant chambers.

8. The apparatus of claim 7 wherein a plurality of separate electrode means are positioned adjacent the same side of the sheet of film to permit the dimensional changes within the sheet of film within each chamber to be varied substantially independently.

9. The apparatus of claim 1 wherein a conductive fluid is employed in the chamber and wherein the excitation means further includes an insulation layer adjacent the electrode means to electrically insulate the electrode means from the fluid.

10. The apparatus of claim 1 wherein the excitation means piezoelectric material includes polyvinylidene fluoride.

11. The apparatus of claim 1 wherein the excitation means include a polyvinylidene fluoride film including at least one electrode means coupled to one surface thereof.

12. The apparatus of claim 11 wherein an electrode means is coupled to both sides of the polyvinylidene fluoride film.

13. The apparatus of claim 11 wherein a conductive fluid is intended for the chambers and wherein the excitation means further includes insulation means adjacent the electrode means to electrically insulate the fluid and electrode means.

14. The apparatus of claim 13 wherein the insulation means includes a polyvinylidene fluoride film.

15. The apparatus of claim 1 further including means for applying to the excitation means an AC voltage having a frequency of from about 30 to about 200 kHz for creating the dimensional changes to the excitation means.

16. The apparatus of claim 1 wherein the excitation means is located adjacent a wall of the chamber opposite to a wall to which the nozzle means is coupled and covers substantially the entire surface of the wall to which it is adjacent.

17. The apparatus of claim 16 wherein the excitation means is opposite a chamber wall including a plurality of nozzle means.

18. The apparatus of claim 16 wherein the excitation means includes a polymeric, piezoelectric material.

19. The apparatus of claim 1 wherein the piezoelectric material has an acoustic impedance near that of a liquid introduced into the chamber.

20. The apparatus of claim 1 wherein the excitation means is a flexible member.

21. The apparatus of claim 1 wherein the excitation means includes a piezoelectric polyvinylidene fluoride film.

22. The apparatus of claim 1 wherein the excitation means is from about 3 to about 600 microns thick.

23. A liquid drop printing system comprising drop generator means including a body having a liquid chamber defining an acoustic resonant frequency for a liquid in the chamber near a desired drop generation frequency, inlet means for coupling the chamber to a source of liquid under pressure, at least one nozzle means coupled to the chamber for emitting a continuous stream of liquid toward a target from which drops are formed and thin, non-bending excitation means coupled to the chamber for stimulating pressure variations in a liquid in the chamber at a frequency near the desired drop generation frequency but itself having an acoustic resonant frequency substantially higher than the desired drop generation frequency including a piezoelectric material and electrode means for coupling to the piezoelectric material to an AC electrical energy source having a frequency near the desired drop generation frequency to promote the formation of the drops at the desired drop generation frequency, liquid source means coupled to the generator means for maintaining a conductive liquid in the chamber under pressure for emitting the continuous stream from the nozzle means toward a target, charging electrode means associated with each nozzle means located adjacent each continuous stream near the point of drop formation for charging the drops and deflection means positioned along the path of charged drops in flight between the electrode means and a target for electrostatically deflecting charged drops.

24. The system of claim 23 further including gutter means for collecting drops not intended for striking a target.

25. The system of claim 23 further including transport means for moving a target and at least the generator and charging means relative to each other.

26. The system of claim 25 wherein the generator means includes a plurality of nozzles in an array, wherein a deflection means is provided for each nozzle means for deflecting drops along a scan line on a target and wherein the transport means includes means for moving a target relative to the scan line for marking the surface of the target.

27. The system of claim 23 wherein the excitation means is coupled to a chamber wall opposite a wall coupled to the nozzle means and wherein the excitation means covers the entire surface area of the wall.

28. The system of claim 27 wherein a plurality of nozzle means are coupled to the chamber for emitting a plurality of continuous streams toward a common target.

29. The system of claim 23 wherein a plurality of nozzle means are coupled to the chamber for emitting a plurality of continuous streams toward a target and wherein the deflection means includes deflection means for each nozzle means for deflecting charged drops along a scan line on a target.

30. Apparatus for generating liquid drops at a desired drop generation frequency comprising a body having a liquid chamber capable of holding a liquid under pressure and defining an acoustic resonant frequency near the drop generation frequency for a liquid in the chamber, inlet means for coupling the chamber to a source of liquid under pressure, at least one nozzle means coupled to the chamber for emitting a continuous stream of liquid due to liquid pressure from which drops are formed and non-bending excitation means including a polymeric, piezoelectric film coupled to the body and electrode means for coupling an AC electrical energy source to the film to create dimensional changes in the film to create pressure variations in a liquid within the chamber to promote the formation of drops from a continuous stream emitted from a nozzle means.

31. Liquid drop generating apparatus for generating drops at a desired drop generation frequency a body having a liquid chamber capable of holding a liquid under pressure and defining an acoustic resonant frequency near the desired drop generation frequency for a liquid in the chamber, inlet means for coupling a liquid under pressure to the chamber, at least one nozzle means coupled to the chamber for emitting a continuous stream of a liquid due to liquid pressure from which drops are formed and non-bending excitation means coupled to the chamber including a piezoelectric, polyvinylidene fluoride film and electrode means for coupling an AC energy source to the film to create dimensional changes in the film related to the $d_{33}$ piezoelectric constant of the film to create pressure variations in a liquid in the chamber to promote the formation of drops from a continuous stream emitted by a nozzle means.

32. Liquid drop generating apparatus for generating drops at a desired drop generating frequency comprising a body having a liquid chamber capable of holding a liquid under pressure and defining an acoustic frequency near the desired drop generation frequency for a liquid in the chamber, inlet means for coupling a liquid under pressure to the chamber, at least one nozzle means coupled to the chamber for emitting a continuous stream of liquid due to the liquid pressure from which drops are formed and non-bending excitation means including a flexible, piezoelectric film coupled to a chamber wall at a location of an acoustic pressure maximum, and electrode means for coupling an AC electrical energy source to the film to create dimensional changes in the film to create pressure variations in a liquid in the chamber to promote the formation of drops form a continuous stream of liquid emitted from a nozzle means.

33. A method of liquid drop generation comprising supplying a chamber within a drop generator with a liquid under pressure for emitting a continuous stream of liquid from the chamber through at least one nozzle coupled to the chamber, the chamber defining an acoustic resonant frequency for a liquid in the chamber near a desired drop generation frequency, coupling a thin, non-bending excitation means including a piezoelectric material to the chamber adjacent a rigid wall opposite the nozzle, the excitation means having an acoustic resonant frequency different than the drop generation frequency, and coupling an AC voltage having a frequency near the desired drop generation frequency to the excitation means to create dimensional variations therein for promoting generation of drops from the continuous stream near the desired drop generation frequency.

34. The method of claim 33 including selecting a polyvinylidene fluoride film as the piezoelectric film for generating the drops.

35. The method of claim 33 including using a conductive fluid for forming the drops and electrically insulating an electrode adjacent the piezoelectric film from the conductive fluid, said electrode being present for applying the AC voltage to the film.

36. The method of claim 33 further including coupling a plurality of nozzles to the chamber for generation of drops from each nozzle in response to dimensional variations in the piezoelectric film.

37. The method of claim 36 including applying a different AC voltage to separate regions of the piezoelectric film to compensate for pressure variations along the nozzle array.

38. The method of claim 33 including shaping the chamber in the form of a rectangle, coupling a nozzle to one wall of the chamber and locating the piezoelectric film at the wall opposite to the wall to which the nozzle is coupled.

39. A liquid drop generating method for generating drops at a desired drop generation frequency comprising supplying a chamber formed in a body member with a liquid under pressure for emitting a continuous stream of the liquid through a nozzle coupled to the chamber from which liquid drops are formed, said chamber defining an acoustic resonant frequency near the desired drop generation frequency for a liquid in the chamber and creating pressure variations in the liquid in the chamber to promote the formation of the liquid drops by steps including applying an AC electrical energy source to a non-bending polymeric, piezoelectric film coupled to the chamber for creating dimensional changes in the film that create the pressure variations in the liquid in the chamber thereby promoting the formation of the liquid drop from the continuous stream.

* * * * *